United States Patent
Teufel et al.

(10) Patent No.: US 8,321,399 B2
(45) Date of Patent: Nov. 27, 2012

(54) METHOD AND SYSTEM FOR SEARCHING DATA

(75) Inventors: Dirk Teufel, Karlsruhe (DE); Cyrille Waguet, St Leon-Rot (DE)

(73) Assignee: SAP AG, Walldorf (DE)

( * ) Notice: Subject to any disclaimer, the term of this patent is extended or adjusted under 35 U.S.C. 154(b) by 504 days.

(21) Appl. No.: 12/336,531

(22) Filed: Dec. 17, 2008

(65) Prior Publication Data
US 2010/0153436 A1 Jun. 17, 2010

(51) Int. Cl.
*G06F 17/30* (2006.01)
(52) U.S. Cl. .................. 707/707; 707/741; 707/971
(58) Field of Classification Search .................. 707/770, 707/707, 971, 741, 999.001
See application file for complete search history.

(56) References Cited

U.S. PATENT DOCUMENTS

| | | | |
|---|---|---|---|
| 6,950,821 B2 * | 9/2005 | Faybishenko et al. | 707/688 |
| 7,895,228 B2 * | 2/2011 | Cragun et al. | 707/769 |
| 7,930,286 B2 * | 4/2011 | Sue | 707/706 |
| 2008/0082495 A1 | 4/2008 | Polo-Malouvier et al. | |
| 2008/0201304 A1 * | 8/2008 | Sue | 707/3 |
| 2010/0100552 A1 * | 4/2010 | Koudas et al. | 707/742 |
| 2010/0274778 A1 * | 10/2010 | Sue | 707/707 |

* cited by examiner

*Primary Examiner* — Dennis Truong

(57) ABSTRACT

A method and system for searching data is provided. An index of a search engine is accessed. Distribution data is extracted from the index of the search engine. A value index is generated from the distribution data. A search request is received from a client. A query is generated based on the search request and the value index. The query is forwarded to the search engine for execution.

18 Claims, 4 Drawing Sheets

METHOD AND SYSTEM FOR SEARCHING DATA

TECHNICAL FIELD

Embodiments of the invention generally relate to computer systems, and more particularly to a method and system for searching data.

BACKGROUND

One of the primary uses of computers is for information storage and retrieval. Database systems have been developed that allow a computer to store a large amount of information in a way that allows a user to search for specific information in the database and retrieve such specific information. For example, an insurance company may have a database that includes all of its policy holders and their current account information, including payment history, premium amount, policy number, policy type, exclusions to coverage, etc. A database system allows the insurance company to retrieve the account information for one or more policy holders among thousands, and perhaps millions, of policy holders in its database and generate reports based upon specific user parameters. Applications have been developed that search databases for specified keywords and return a list of results where the keywords are found. Such applications are generally referred to as search engines. Frequently, users need to conduct searches in order to retrieve data spread over several databases, sometimes spread across multiple countries, and managed by multiple search engines. Searches conducted using web search engines (such as Google by Google Inc. of Mountain View, Calif., US) to search for information on the World Wide Web are good examples of such searches. Such extensive and complicated searches are typically conducted by meta search engines.

A meta search engine is a search engine that sends user requests to several other search engines and/or databases and aggregates the results into a single list or displays them according to their source. Meta search engines enable users to enter search criteria once and access several search engines simultaneously. Meta search engines operate on the premise that the World Wide Web is too large for any one search engine to index it all and that more comprehensive search results can be obtained by combining the results from several search engines. This also may save the user from having to use multiple search engines separately.

The performance of meta searches mainly depends on the reaction time of the underlying search engines and on the overhead of distributing queries to all search engines. Distributing all queries to all search engines leads to poor performance from the end user perspective, especially if the meta search uses many search engines. Another performance bottleneck is usually the wide variety of search engines used for conducting meta searches such as the search engines used for an enterprise search spanning the whole field of search on structured data (e.g. business objects) and unstructured data (documents).

One solution that has been employed to overcome the above performance bottlenecks is the use of pre-configured keywords that address one or a group of search engines. Thus a query for conducting a search based on a pre-configured keyword would be forwarded only to those search engines that have already been configured for the keyword. Although this method results in some performance improvements it has many limitations. A search conducted using a pre-configured keyword is limited to the configured search engines only. In addition, the keywords are typically language dependent and thus create an overhead for internationalization.

Thus there is no meta search technique currently available that intelligently targets search engines in a network and at the same time provides a comprehensive search. An intelligent and comprehensive search targets every search engine that may possibly contain data matching a provided keyword.

SUMMARY OF THE INVENTION

Embodiments of the invention are generally directed to a method and system for searching data. An index of a search engine is accessed. Distribution data is extracted from the index of the search engine. A value index is generated from the distribution data. A search request is received. A query is generated based on the search request and the value index. The query is forwarded to the search engine for execution.

These and other benefits and features of embodiments of the invention will be apparent upon consideration of the following detailed description of preferred embodiments thereof, presented in connection with the following drawings. The invention is illustrated by way of example and not by way of limitation in the figures of the accompanying drawings. It should be noted that references to "an" or "one" embodiment in this disclosure are not necessarily to the same embodiment, and such references mean at least one.

BRIEF DESCRIPTION OF THE DRAWINGS

The claims set forth the embodiments of the invention with particularity. The embodiments of the invention, together with its advantages, may be best understood from the following detailed description taken in conjunction with the accompanying drawings in which like reference numerals are used to identify like elements throughout.

DETAILED DESCRIPTION

Figure 1:
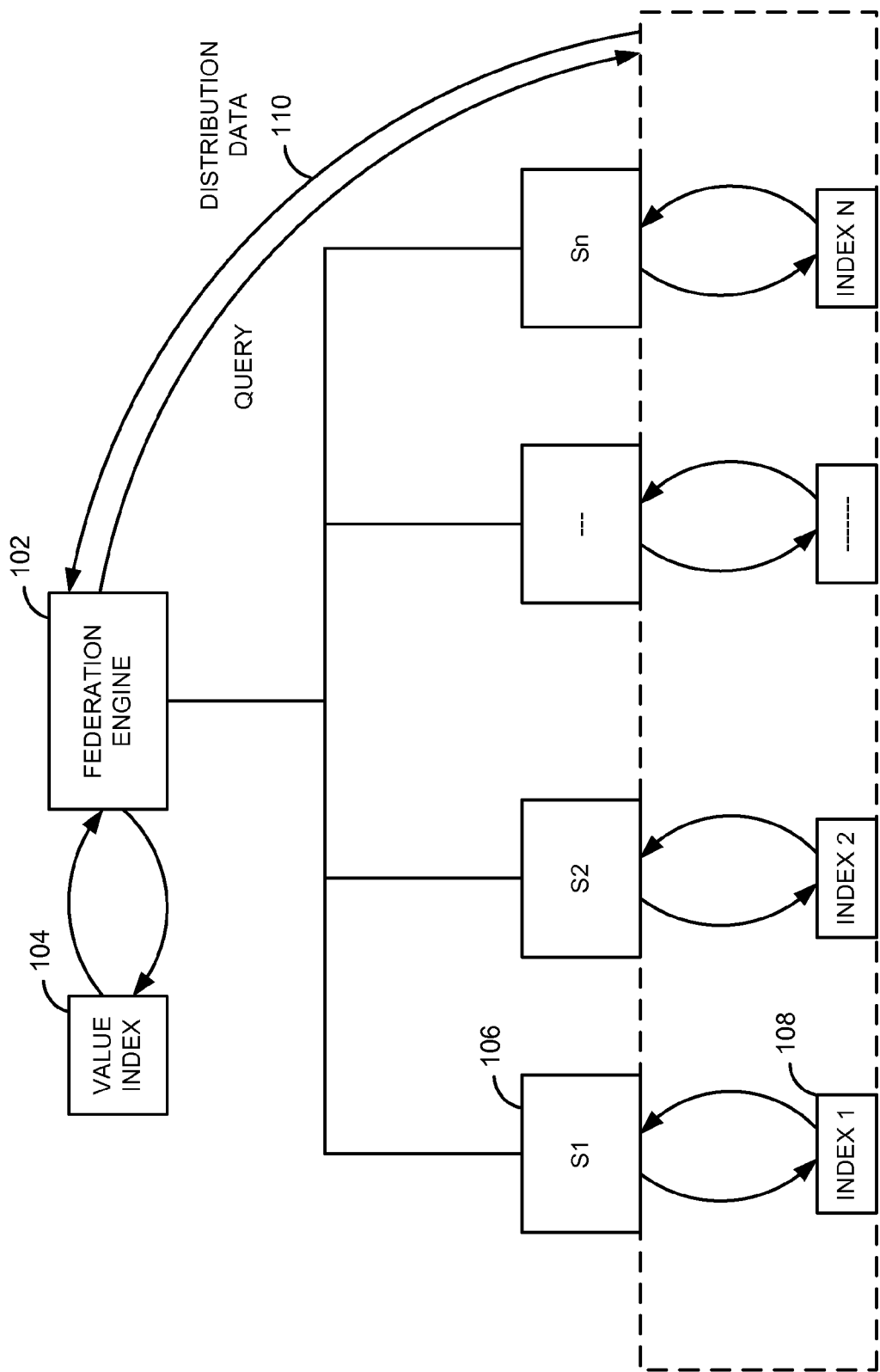
FIG. 1 is a functional block diagram of a system for searching data according to an embodiment of the invention.

FIG. 1 is a functional block diagram of a system for searching data according to an embodiment of the invention. Federation engine 102 is generally connected to one or more backend search engines each having an index (e.g., search engine 106 having index 108). The primary responsibility of the federation engine 102 is to receive search requests from a client such as a user. Next generate one or more queries based on the search request. The federation engine 102 forwards the queries to one or more search engines 106. After receiving search results from the search engines 106, the federation engine 102 combines and formats the results received and presents the formatted results to the user.

Federation engine 102 is also responsible for generating and maintaining a value index 104. Value index 104 generally includes data that indicates which of the search engines 106 connected to the federation engine 102 are most likely to return results for a given keyword. Each of the search engines 106 generally stores distribution data in their respective indices 108. The distribution data stored in the index 108 of a search engine 106 includes information corresponding to the organization and distribution of data over one or more databases, memory elements or servers. Federation engine 102 has access to the indices 108 of all the search engines 106 it is connected with. Each of the search engines 106 generally provides an application programming interface to federation engine 102 to enable access to the indices 108.

Federation engine 102 accesses the indices 108 of each of the search engines 106 and extracts distribution data 110 from the indices 108. Distribution data 110 is then used by federation engine 102 for generating value index 104. Value index 104 is preferably stored locally in the federation engine 102. Value index 104 may include one or more values that all attributes may take for a given search engine 106. Table-1 illustrates a value index 104 that stores the values that may be taken for attributes 'Name', 'City', 'Address' and the like for search engines 'Engine-1', 'Engine-2' and 'Engine-3'.

TABLE 1

| Value | Location |
| --- | --- |
| Business Object | Engine-1 |
| Paris | Engine-1 |
| Atlanta | Engine-1 |
| Coca Cola | Engine-1 |
| Paris | Engine-2 |
| L'Oreal | Engine-1 |
| Seattle | Engine-3 |

Alternatively, value index 104 may include one or more values that an attribute may take corresponding an object type for a given search engine 106. Table-2 illustrates a value index 104 that stores the values that may be taken for attributes corresponding to specific object types for engines 'Engine-1', 'Engine-2' and 'Engine-3'. For instance, in 'Engine 1'value 'Business Object' may be taken for an attribute 'Name' corresponding to an object type 'Customer'.

TABLE 2

| Value | Object Type | Attribute | Location |
| --- | --- | --- | --- |
| Business Object | Customer | Name | Engine-1 |
| Paris | Customer | City | Engine-1 |
| Paris | Material | Origin | Engine-1 |
| Atlanta | Customer | City | Engine-1 |
| Coca Cola | Customer | Name | Engine-1 |
| Paris | Vendor | City | Engine-1 |
| L'Oreal | Vendor | Name | Engine-1 |
| Paris | Supplier | Location | Engine-2 |
| Seattle | Business Partner | Address | Engine-3 |

In one embodiment, the value index 104 is updated each time a search engine connected to the federation engine 102 creates or updates its index 108.

Every time the federation engine 102 receives a search request based on one or more search keywords, federation engine 102 looks up the value index 104 and determines one or more search engines 106 that are likely to return results for the search keyword. A query is then generated by the federation engine 102 based on the search keyword and the look up results of the value index 104. The query is then forwarded to the determined search engines 106 for execution. In an embodiment, a separate query is generated for each of the determined search engines 106. For instance, if the value index 104 is organized as given in Table-1 and the user provides a search keyword 'Paris', the federation engine 102 will lookup the value index 104 and forward the query to 'Engine-1' and 'Engine-2'. All information corresponding to the keyword 'Paris' is retrieved by 'Engine-1' and 'Engine-2'.

In another example, the value index 104 is organized as given in Table-2 and the user provides 3 keywords namely a keyword for a value as 'Paris', a key for an attribute as 'City' and a keyword for an object type as 'Customer'. The federation engine 102 looks up the value index 104 and forwards the query to 'Engine-1' only. All information corresponding to the customer city being Paris is retrieved by 'Engine-1'.

Federation engine 102 finally receives the search results from each of the search engines, combines and formats the results and presents the results to the user.

Figure 2:
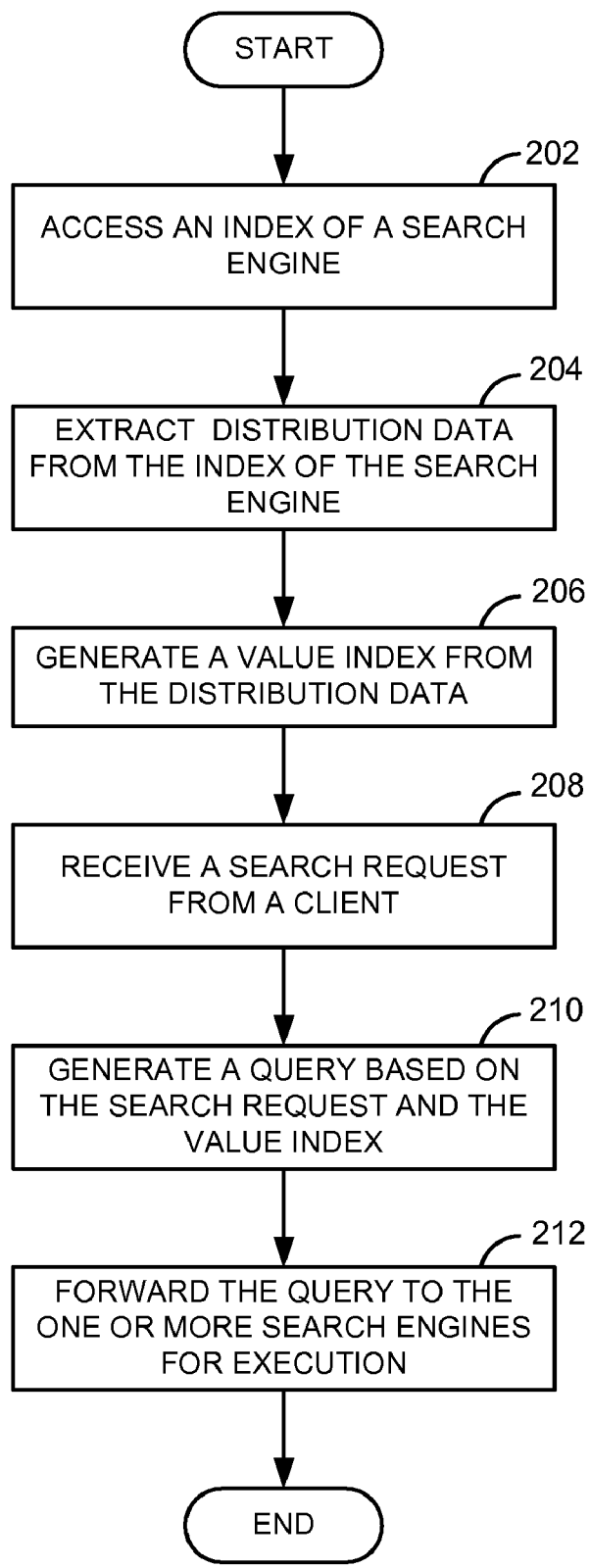
FIG. 2 is a flow diagram of a process for searching data according to an embodiment of the invention.

FIG. 2 is a flow diagram of a process for searching data according to an embodiment of the invention. In process block 202 an index of a search engine is accessed by a federation engine (102 in FIG. 1). A federation engine is generally connected to one or more backend search engines each having an index. In process block 204 distribution data is extracted from the index of the search engine. Each of the search engines connected to the federation engine stores distribution data in their respective indices. The distribution data stored in the index of a search engine includes information corresponding to the organization and distribution of data over one or more databases, memory elements or servers. Federation engine generally has access to the indices of all the search engines it is connected with.

In process block 206, a value index (104 in FIG. 1) is generated from the distribution data by the federation engine. The value index may include one or more values that all attributes may take for a given search engine. Alternatively, the value index may include one or more values that an attribute may take corresponding an object type for a given search engine. In process block 208, a search request is received from a client, such as a user. The search request typically includes one or more search keywords. In process block 210, a query is generated by the federation engine based on the search request and the value index. Finally in process block 212, the query is forwarded by the federation engine to one or more search engines for execution.

Figure 3:
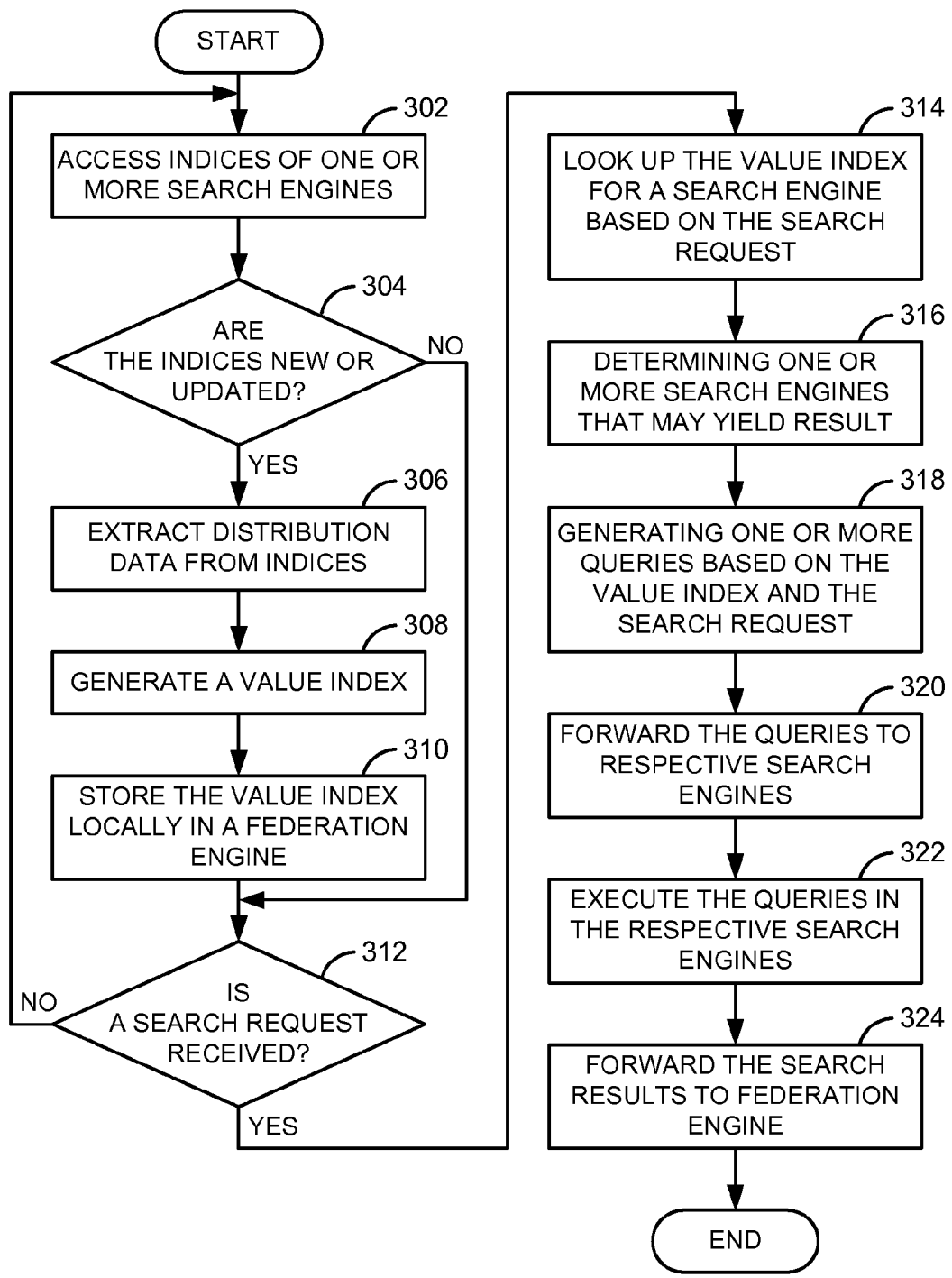
FIG. 3 is a flow diagram of a process for searching data according to an embodiment of the invention.

FIG. 3 is a flow diagram of a process for searching data according to an embodiment of the invention. In process block 302, indices of one or more search engines is accessed by a federation engine (e.g., 102 in FIG. 1). At decision block 304 the federation engine checks whether the indices of each of the search engines are new or updated since they were last accessed by the federation engine. If none of the search engines are new or have been updated since the last access, the process moves to decision block 312. If any of the search engines have been newly created or updated, the process moves to process block 306 where the federation engine extracts the distribution data from the index of a new or updated search engine.

In process block 308, a value index (104 in FIG. 2) is generated from the extracted distribution data by the federation engine. The value index generally includes data that indicates as to which of the search engines connected to the meta search controller are most likely to return results for a given keyword. The value index may also include one or more values that all attributes may take for a given search engine. Alternatively, the value index may include one or more values that an attribute may take corresponding an object type for a given search engine. In process block 310, the value index is stored locally in the federation engine. Decision block 312 checks whether a search request is received from a user by the federation engine. The search request typically includes one or more search keywords based on which the user wants to conduct a search. If a search request is not received, the process rolls back to process block 302. If a search request is received, the process moves to process block 314 where the federation engine looks up the value index for a search engine based on the search request. In process block 316, the federation engine determines one or more search engines that are likely to return results for the provided search keywords. In process block 318, based on the value index and the search request, one or more queries are generated by the federation engine. In an embodiment, the federation engine generates one query for each of the search engines. In process block 320, the queries are forwarded for execution to their respective search engines pre-determined by the federation engine. In process block 322, each of the queries is executed in their respective search engines. Finally, in process block 324, the search results are forwarded by each of the search engines to back to the federation engine. The federation engine, on receiving the search results from the search engines, combines the results. In an embodiment, the federation engine formats the results and presents the results to the user. In another embodiment another software component such as report engine, graphical user interface (GUI) may combine and format the results.

Figure 4:
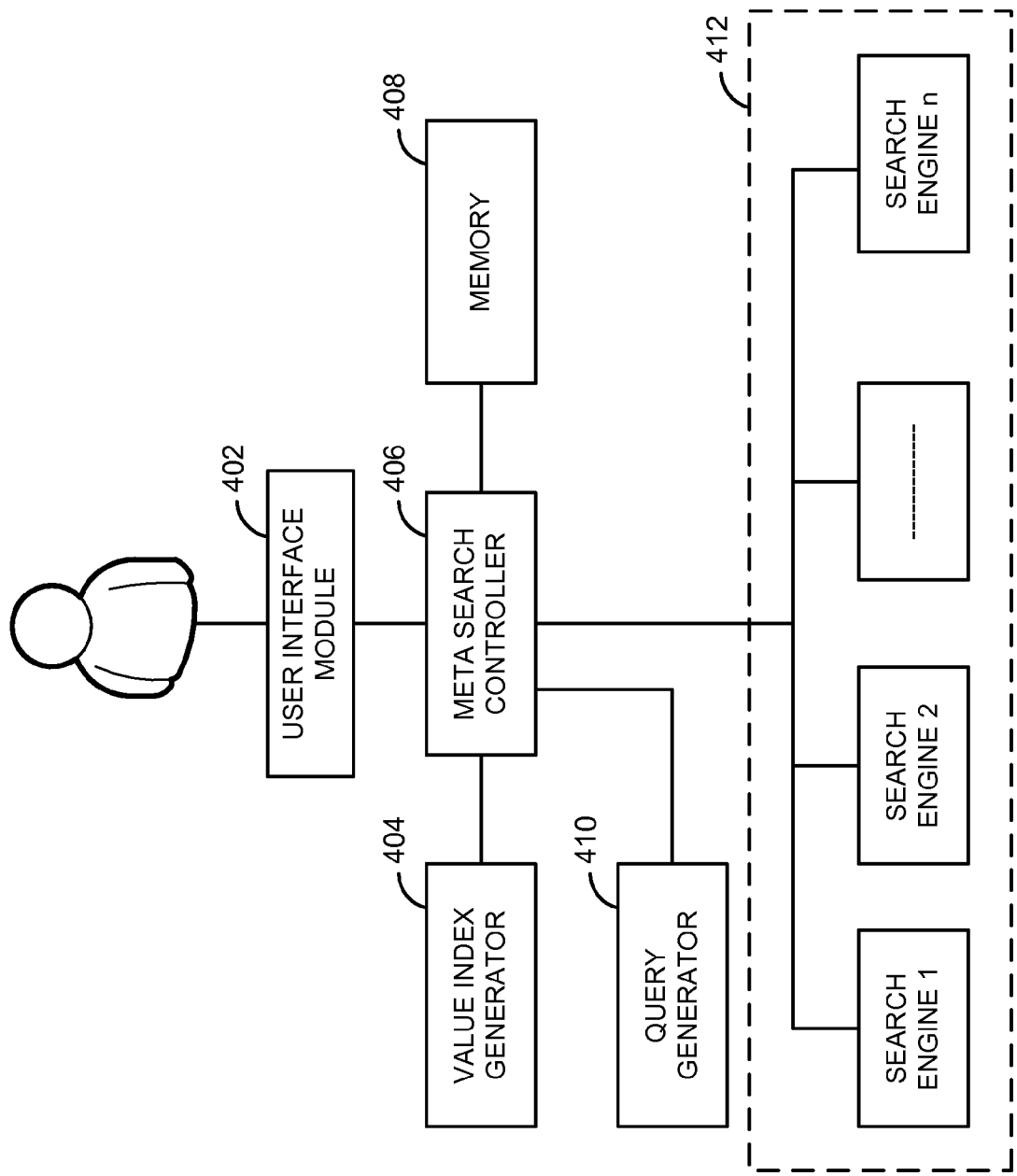
FIG. 4 is a block diagram of a system for searching data implementing an embodiment of the invention.

FIG. 4 is a block diagram of a system for searching data according to an embodiment of the invention. User interface module 402 acts as an interface between the user and rest of the components of the system. Meta search controller 406 is coupled to the user interface module 402, value index generator 404, query generator 410, memory 408 and one or more search engines 412. Each of the search engines 412 has an index (not shown).

Value index generator 404 is also responsible for generating and maintaining a value index. The value index generally includes data that indicates as to which of the search engines 412 connected to the meta search controller 406 are most likely to return results for a given keyword. Each of the search engines 412 generally store distribution data in their respective indices. The distribution data stored in the index of a search engine 412 includes information corresponding to the organization and distribution of data over one or more databases, memory elements or servers. Meta search controller 406 has access to the indices of all the search engines 412 that it is connected with. Each of the search engines 412 generally provides an application programming interface to the meta search controller 406 to enable access to the indices.

Meta search controller 406 accesses the indices of each of the search engines 412 and extracts distribution data from the indices. The distribution data is then used by the value index generator 404 for generating the value index. The value index is typically stored locally in the memory 408. The value index may include one or more values that all attributes may take for a given search engine 412. Alternatively, the value index may include one or more values that an attribute may take corresponding an object type for a given search engine 412. In one embodiment, the value index is updated each time a search engine 412 connected to the meta search controller 406 creates or updates its index.

Every time the meta search controller 406 receives a search query based on one or more search keywords through the user interface module 402, the meta search controller 406 looks up the value index and determines one or more search engines 412 that are likely to return results for the search keyword. A query is then generated by the query generator 410 based on the search keywords and the look up results of the value index. The query is then forwarded by the meta search controller 406 to the determined search engines 412 for execution. In an embodiment, a separate query is generated for each of the determined search engines 412. Meta search controller 406 finally receives the search results from each of the search engines, combines and formats the results and presents the results to the user.

The particular methods associated with embodiments of the invention are described in terms of computer software and hardware with reference to flowcharts. The methods to be performed by a computing device (e.g., an application server) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

Elements of the invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, or other type of machine-readable media suitable for storing electronic instructions. For example, the invention may be implemented as a method performed in a client-server network with the execution the methods distributed across the network.

It should be appreciated that reference throughout this specification to one embodiment or an embodiment means that a particular feature, structure or characteristic described in connection with the embodiment is included in at least one embodiment of the present invention. These references are not necessarily all referring to the same embodiment. Furthermore, the particular features, structures or characteristics may be combined as suitable in one or more embodiments of the invention.

Throughout the foregoing description, for the purposes of explanation, numerous specific details were set forth in order to provide a thorough understanding of the invention. It will be apparent, however, to one skilled in the art that the invention may be practiced without some of these specific details. For instance, the detailed description as set forth above includes descriptions of method steps. However, one skilled in the art will understand that the order of the steps set forth above is meant for the purposes of illustration only and the claimed invention is not meant to be limited only to the specific order in which the steps are set forth. Accordingly, the scope and spirit of the invention should be judged in terms of the claims which follow.

What is claimed is:

1. A computer implemented method for searching data, the method comprising:
   receiving a search request from a client;
   looking up, by a processor of the computer, a value index based on the received search request, wherein the value index includes a plurality of elements comprising:
       an object type defining type of objects in a plurality of search engines;

a plurality of attributes of the object type;
a plurality of values that the plurality of attributes take for the plurality of search engines; and
the plurality of search engines, and wherein the plurality of elements included in the value index have at least two levels of hierarchy;
based on the look up, determining, by the processor of the computer, a search engine from among the plurality of search engines;
generating, by the processor of the computer, a query based on the search request and the value index;
forwarding, by the processor of the computer, the generated query to the determined search engine for execution; and
executing, by the processor of the computer, the generated query in the determined search engine for conducting a search based on the generated query.

2. The computer implemented method of claim 1 further comprising:
forwarding, by the processor of the computer, a result of the search to a federation engine.

3. The computer implemented method of claim 1, further comprising updating, by the processor of the computer, the value index each time the plurality of search engines create or update an index.

4. The computer implemented method of claim 1, further comprising generating the value index from a distribution data extracted from an index of a search engine, wherein generating the value index comprises storing, in a memory of the computer, the plurality of values that the plurality of attributes take for the search engine.

5. The computer implemented method of claim 1, further comprising generating the value index from a distribution data extracted from an index of a search engine, wherein generating the value index comprises storing, in a memory of the computer, the plurality of values that the plurality of attributes take corresponding to the object type for the search engine.

6. The computer implemented method of claim 1 further comprising storing, in a memory of the computer, the value index locally in a federation engine.

7. The computer implemented method of claim 1 further comprising loading, by the processor of the computer, the value index on to a federation engine through an application programming interface of the federation engine.

8. The computer implemented method of claim 1, further comprising accessing an index of the plurality of search engines, wherein accessing, by the processor of the computer, the index of the plurality of search engines comprises accessing, the plurality of search engines using an application programming interface provided by the search engine.

9. A computer system for searching data, the computer system comprising:
a processor; and
a memory coupled to the processor to store program code, the program code comprising:
a user interface module to act as an interface between a user and the computer system;
a meta search controller coupled to the user interface module for accessing an index of a plurality of search engines and extracting distribution data from the index of the plurality of search engines;
a value index generator coupled to the meta search controller for generating a value index from the distribution data, wherein the value index includes a plurality of elements comprising:
an object type defining type of objects in the plurality of search engines;
a plurality of attributes of the object type;
a plurality of values that the plurality of attributes take for the plurality of search engines; and
the plurality of search engines, and wherein the plurality of elements included in the value index have at least two level of hierarchy; and
a query generator coupled to the meta search controller for generating a query based on a search request received from the user interface module and the value index wherein the meta search controller forwards the query to a search engine from the plurality of search engines for execution, and wherein the search engine executes the query for conducting a search based on the query.

10. The computer system of claim 9 wherein the memory is coupled to the meta search controller for storing the value index.

11. A non-transitory machine-readable medium that stores instructions that, cause a machine to execute operations comprising:
receiving a search request from a client;
looking up a value index based on the received search request, wherein the value index includes a plurality of elements comprising:
an object type defining type of objects in a plurality of search engines;
a plurality of attributes of the object type;
a plurality of values that the plurality of attributes take for the plurality of search engines; and
the plurality of search engines, and wherein the plurality of elements included in the value index have at least two levels of hierarchy;
based on the look up, a search engine from among the plurality of search engines, generating a query based on the search request and the value index;
forwarding the generated query to the determined search engine for execution; and
executing the generated query in the determined search engine for conducting a search based on the generated query.

12. The machine-readable medium of claim 11 further comprising instruction which when executed by the machine causes the machine to perform further operations comprising:
forwarding a result of the search to a federation engine.

13. The machine-readable medium of claim 11 further comprising instructions which when executed by the machine cause the machine to perform further operations comprising updating the value index each time the plurality of search engines create or update an index.

14. The machine-readable medium of claim 11, further comprising instructions which when executed by the machine cause the machine to perform further operations comprising generating the value index from a distribution data extracted from an index of a search engine, wherein generating the value index comprises storing the plurality of values that the plurality of attributes take for the search engine.

15. The machine-readable medium of claim 11, further comprising instructions which when executed by the machine cause the machine to perform further operations comprising generating the value index from a distribution data extracted from an index of a search engine, wherein generating the value index comprises storing the plurality of values that the plurality of attributes take corresponding to the object type for the search engine.

16. The machine-readable medium of claim 11 further comprising instructions which when executed by the machine cause the machine to perform further operations comprising storing the value index locally in a federation engine.

17. The machine-readable medium of claim 11 further comprising instructions which when executed by the machine cause the machine to perform further operations comprising loading the value index on to a federation engine through an application programming interface of the federation engine.

18. The machine-readable medium of claim 11, further comprising instructions which when executed by the machine cause the machine to access an index of the plurality of search engines, wherein accessing the index of the plurality of search engines further comprises accessing the plurality of search engines using an application programming interface provided by the search engine.

* * * * *